(12) United States Patent
Teulet

(10) Patent No.: US 7,789,037 B2
(45) Date of Patent: Sep. 7, 2010

(54) DEVICE FOR THE PRODUCTION OF THIN POWDER LAYERS, IN PARTICULAR AT HIGH TEMPERATURES, DURING A METHOD INVOLVING THE USE OF A LASER ON A MATERIAL

(75) Inventor: Patrick Didier Teulet, Riom (FR)

(73) Assignee: Phenix Systems, Clermont-Ferrand (FR)

( * ) Notice: Subject to any disclaimer, the term of this patent is extended or adjusted under 35 U.S.C. 154(b) by 831 days.

(21) Appl. No.: 10/561,833

(22) PCT Filed: Jun. 28, 2004

(86) PCT No.: PCT/FR2004/001646

§ 371 (c)(1),
(2), (4) Date: Mar. 2, 2007

(87) PCT Pub. No.: WO2005/002764

PCT Pub. Date: Jan. 13, 2005

(65) Prior Publication Data

US 2007/0245950 A1 Oct. 25, 2007

(30) Foreign Application Priority Data

Jun. 30, 2003 (FR) .................................. 03 07888

(51) Int. Cl.
*B05C 13/00* (2006.01)
(52) U.S. Cl. .......................... 118/64; 264/225; 425/130; 425/215; 37/225; 37/433; 37/441; 37/365
(58) Field of Classification Search ................ 264/225; 425/130, 215; 37/225, 433, 441, 365
See application file for complete search history.

(56) References Cited

U.S. PATENT DOCUMENTS

| 1,429,089 | A | * | 9/1922 | Olberg ........................ 37/441 |
| 3,854,975 | A | * | 12/1974 | Brenneman et al. ..... 430/124.23 |
| 5,252,264 | A | | 10/1993 | Forderhase |
| 5,876,550 | A | | 3/1999 | Feygin |

(Continued)

FOREIGN PATENT DOCUMENTS

FR 2 774 931 8/1999

(Continued)

*Primary Examiner*—Parviz Hassanzadeh
*Assistant Examiner*—Albert Hilton
(74) *Attorney, Agent, or Firm*—Dowell & Dowell, P.C.

(57) ABSTRACT

The invention relates to a device serving both to lay thin layers of powder and to compact them, the device being suitable for being located inside an apparatus containing a powder or powder mixture while it is subjected to the action of a laser. The device comprises a circular cylinder (12) provided with a longitudinal groove (15) formed in an outside surface of the cylinder (12). The cylinder also has a surface (12a) adapted to compact the powder that has been deposited on a deposition zone. By moving the cylinder in rotation and translation, the powder is brought to and deposited on a tray, on which the powder is then compacted by rotating the cylinder in the opposite direction. The invention enables very thin layers of ceramic or metallic powder to be laid in accurate and uniform manner inside a sealed thermal enclosure at a temperature lying between ambient temperature and about 1200° C.

10 Claims, 6 Drawing Sheets

U.S. PATENT DOCUMENTS

| | | | | |
|---|---|---|---|---|
| 5,964,155 A | * | 10/1999 | Platsch | 101/424.2 |
| 6,391,251 B1 | | 5/2002 | Bullen et al. | |
| 6,767,499 B1 | * | 7/2004 | Hory et al. | 264/497 |
| 2002/0195439 A1 | * | 12/2002 | Moller | 219/400 |
| 2003/0059492 A1 | | 3/2003 | Gaillard | |

FOREIGN PATENT DOCUMENTS

| | | | |
|---|---|---|---|
| WO | WO 99/42421 | * | 8/1999 |

* cited by examiner

DEVICE FOR THE PRODUCTION OF THIN POWDER LAYERS, IN PARTICULAR AT HIGH TEMPERATURES, DURING A METHOD INVOLVING THE USE OF A LASER ON A MATERIAL

The invention relates to a device for making thin layers of a powder or a mixture of powders, and more particularly making thin layers of ceramic or metallic powder or of a mixture of ceramic or metallic powders, for use in a process based on the action of a laser on a material contained in a thermal enclosure, in particular in a process of sintering by means of a laser beam.

WO-A-99/42421 discloses a fast prototyping method based on using a laser to perform solid phase sintering of a powder or of a mixture of powders. For that purpose, use is made of an oven heated to 900° C., together with a commercially-available ceramic or metallic powder or a mixture of ceramic or metallic powders of any grain size or distribution. In that method, a work plane is provided with two wells, the first forming a supply from which the powder or powder mixture is taken, and transferred to over the second well where it is spread in thin layers, prior to being sintered using a laser beam. The powder or powder mixture is transported between the two wells by a device described in WO-A-01/41939. That device is guided in translation and movable in rotation. Its face that comes into contact with the powder is provided with three indentations for scraping the powder or powder mixture. The scraper formed in this way moves at a given angle relative to the work plane, thereby compressing the powder partially thereagainst. In the method described in WO-A-99/42421, the scraper is connected to a roller that is free to rotate and that is driven in translation by its own weight. The roller acts behind the scraper and compacts the powder or powder mixture. The scraper and the roller move in a work plane provided with guide rails, and studs on the flanks of the rails which thus enable the scraper to be tilted at the end of its stroke. When using arbitrary powders or powder mixtures, such a device does not make it possible in reliable manner to obtain a thickness, a surface quality, and a shape as desired for the layer deposited in that way. Furthermore, in an atmosphere that may be at a temperature that can reach 900° C., it is difficult to use such a device for making layers. After a few passes, an abrasion and wear phenomenon appears on the various parts situated in the enclosure. The abrasion and the wear spoil the uniformity of the layers as deposited in that way. In addition, those two members are guided inside the thermal enclosure. Insofar as the enclosure is subjected to a temperature that can be as high as 900° C., the means for guiding the scraper and the roller are subject to expansion. They do not necessarily expand by the same amounts, thereby degrading the accuracy with which the powder or powder mixture is laid out in layers. Furthermore, driving the roller under its own weight does not make it any easier for it to be guided in regular and accurate manner.

Irregularities in the positioning of the roller on the guide rails, and an abrasion phenomenon due to the scraper sliding on the same rails increase the inaccuracy with which the layers are laid.

Furthermore, such a device for laying powder in layers comprises two distinct elements, the scraper and the compacting roller, and the total bulk thereof requires the work plane and the enclosure to be of considerable length. This dimensioning of the apparatus, and in particular of the enclosure, does not make it easy to regulate temperature within the enclosure. It thus frequently happens that a temperature gradient arises, thereby accentuating the previously-observed expansion differences between the scraper and the roller. In practice, in addition to high manufacturing cost, it is practically impossible with such a system to lay a plurality of thin layers in succession having a thickness of less than 100 micrometers (μm). Even with layers thicker than 100 μm, when the grain size of the powder or powder mixture makes that possible, the thicknesses and the uniformity of the layers as deposited in that way are often insufficient to allow a laser to act on the material, in particular to allow parts to be sintered.

U.S. Pat. No. 5,252,264 discloses apparatus fitted with a roller having an outside surface that is rough. Thus, the powder is held in position in the indentations of the roller. A blade can be used for dislodging the powder. With such apparatus, the retention of powder on the roller and the deposition of powder are unsuitable for laying thin layers with all types of powder.

The invention seeks more particularly to remedy those drawbacks by proposing a device enabling powder or powder mixtures to be laid in thin and uniform layers having a minimum thickness of about 5 μm, and capable of doing this at high temperatures of up to about 1200° C., while ensuring that the layers are of the quality needed for a laser to act on the material, and while making it possible to avoid the consequences of a temperature gradient and the effects of abrasion on the means for laying the layers.

To this end, the invention provides a device for laying at least one thin layer of a powder or powder mixture, the device being used to enable a laser to act on the material contained in a thermal enclosure, the device comprising storage means, powder or powder mixture feeder means, a deposition zone for depositing said powder or powder mixture taken from said storage means, and means for compacting the powder or powder mixture deposited in said deposition zone, the device being characterized in that it comprises a circular cylinder provided firstly with at least one groove formed in an outside surface of said cylinder and adapted to feed powder or powder mixture from a storage means and feed it to a deposition zone, and secondly with a surface adapted to compact the powder or powder mixture previously deposited on said deposition zone, said cylinder, said storage means, said deposition zone, and the powder or powder mixture being situated inside said enclosure that is suitable for being maintained at high temperature while enabling the cylinder to be guided and driven from outside said enclosure.

By means of the invention, a device is provided that uses the same means to perform the functions both of feeding and of compacting inside an enclosure that is maintained at high temperature, and that does so in a manner that is coordinated. In addition to reducing size, such a device enables the device to be guided accurately and constantly, thereby guaranteeing that the layers are laid uniformly, even when the layers are thin. The small size of such a device also makes it possible to overcome different dimensional differences between the feeder means and the compactor means as can be generated by the thermal gradient that exists between different zones of an enclosure. The use of a feed groove enables powder to be deposited in optimized manner, while the compactor surface can have a surface state that is adapted to its function. Thus, a single member enables powder to be taken, deposited, and compacted.

According to advantageous but non-essential features of the invention, the device incorporates one or more of the following characteristics:

The surface adapted for compacting comprises at least a fraction of an outside surface of said cylinder in which at least one groove is formed.

The groove extends between the two ends of the cylinder in a direction that is generally parallel to the longitudinal axis of the member.

The groove presents a cross-section that is generally in the configuration of a flat-bottomed V-shape.

The circumference of the cylinder is perceptibly greater than the diameter of the deposition zone.

The roughness of the outside surface of the cylinder is smaller than the roughness of the surface of the deposition zone, the roughness of the outside surface of the cylinder being adapted to the minimum grain size of the powder.

The temperature at which the enclosure and the elements situated therein are maintained lies between ambient temperature and about 1200° C.

The positioning, guiding, and driving of the cylinder are performed by positioning and guidance members, and by an actuator situated outside the enclosure of the device.

Flaps disposed in the flanks of the enclosure are movable in different directions relative to a plane in which the longitudinal axis of the cylinder moves when the cylinder is moved. Advantageously, these flaps are triangle- and parallelogram-shaped, being disposed as a baffle and in mutual contact, so as to provide thermal insulation for the enclosure while enabling the cylinder to be connected to the members for positioning, guiding, and driving the cylinder.

The invention can be better understood and other advantages thereof appear more clearly in the light of the following description of two embodiments of a device in accordance with the invention, given purely by way of example and made with reference to the accompanying drawings, in which:

FIG. 1 is a fragmentary section of a device in accordance with the invention, in which only the portion comprising the storage means, the deposition zone, and the member for laying the layers are shown, the member for laying the layers being shown in section, inside a closed enclosure, in the position for depositing powder over the deposition zone, the guide system outside the enclosure not being shown;

Figure 1:
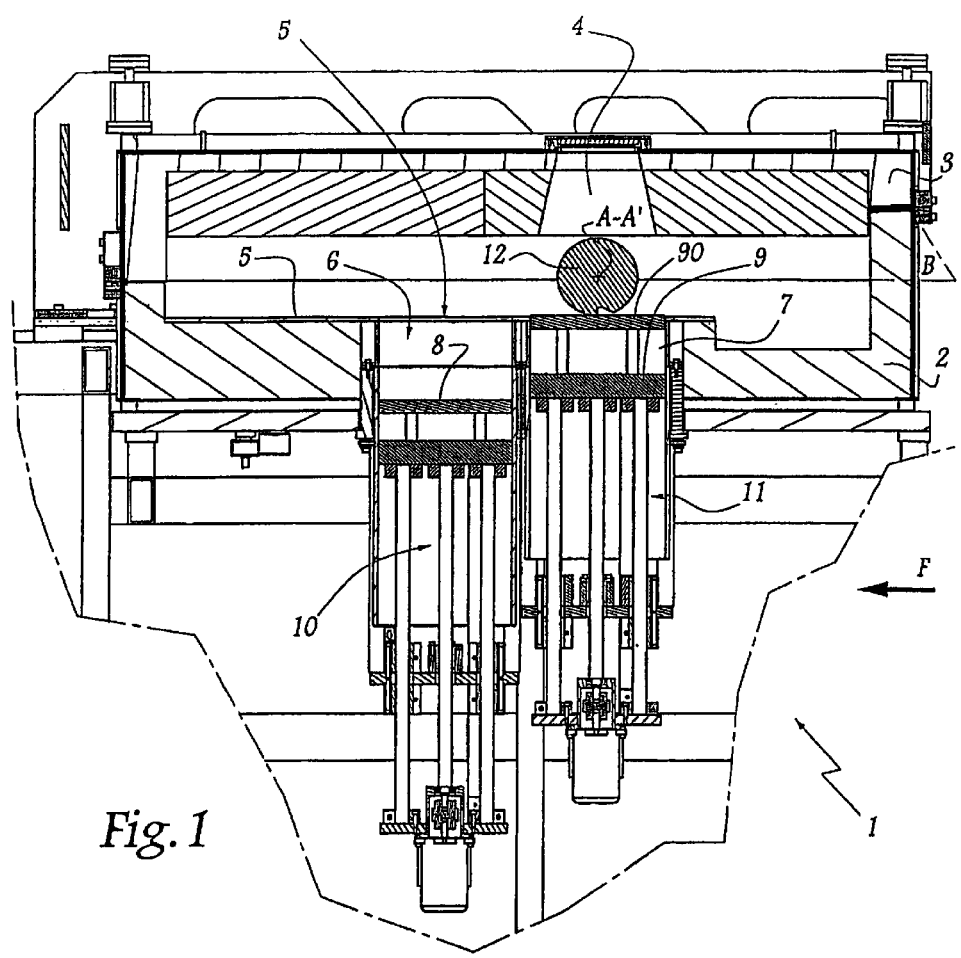
Figure 2:
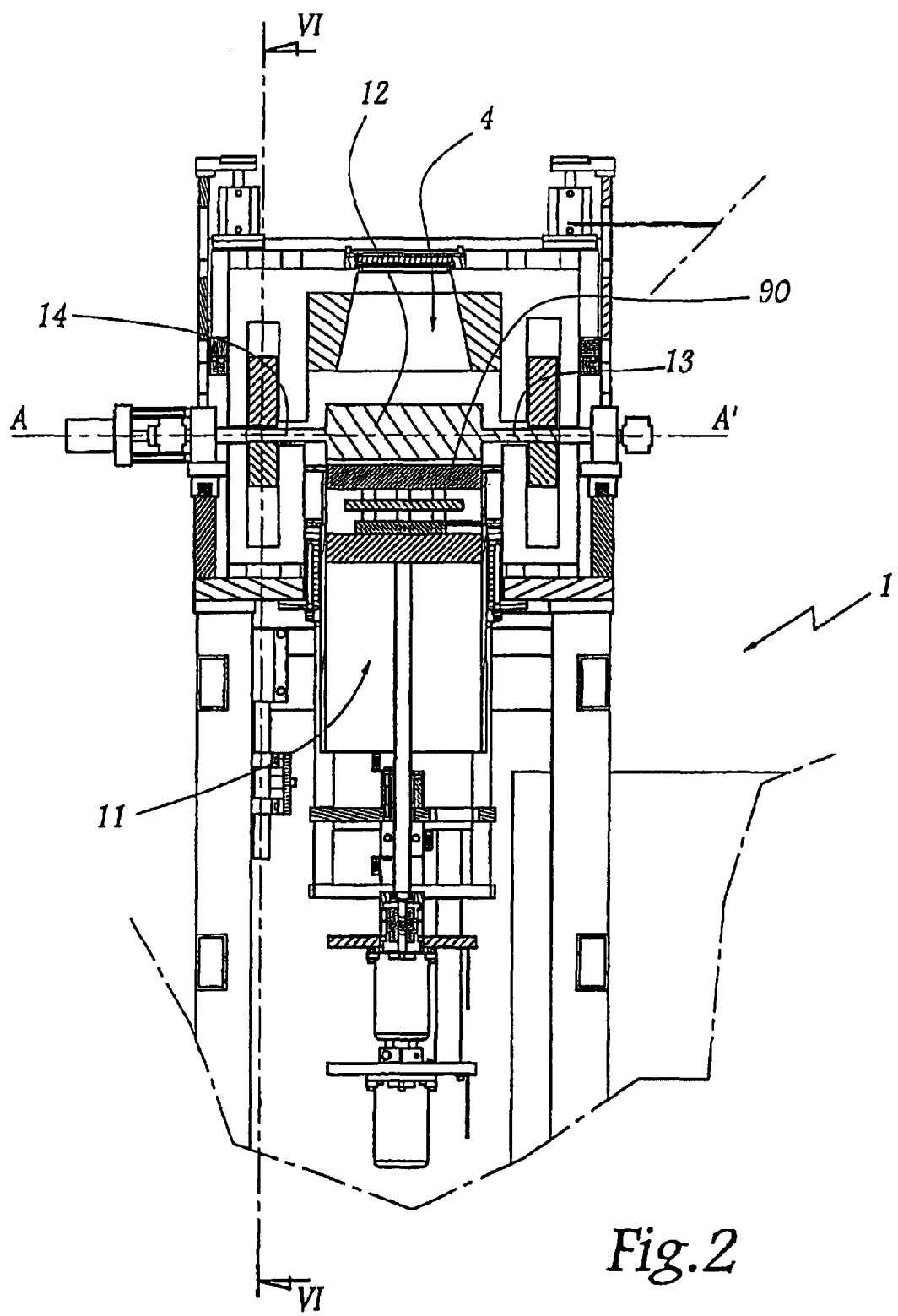
FIG. 2 is a section of the device shown in the preceding figure, the member for laying the layers being shown in a face view looking along arrow F in FIG. 1.
Figures 3, 3A:
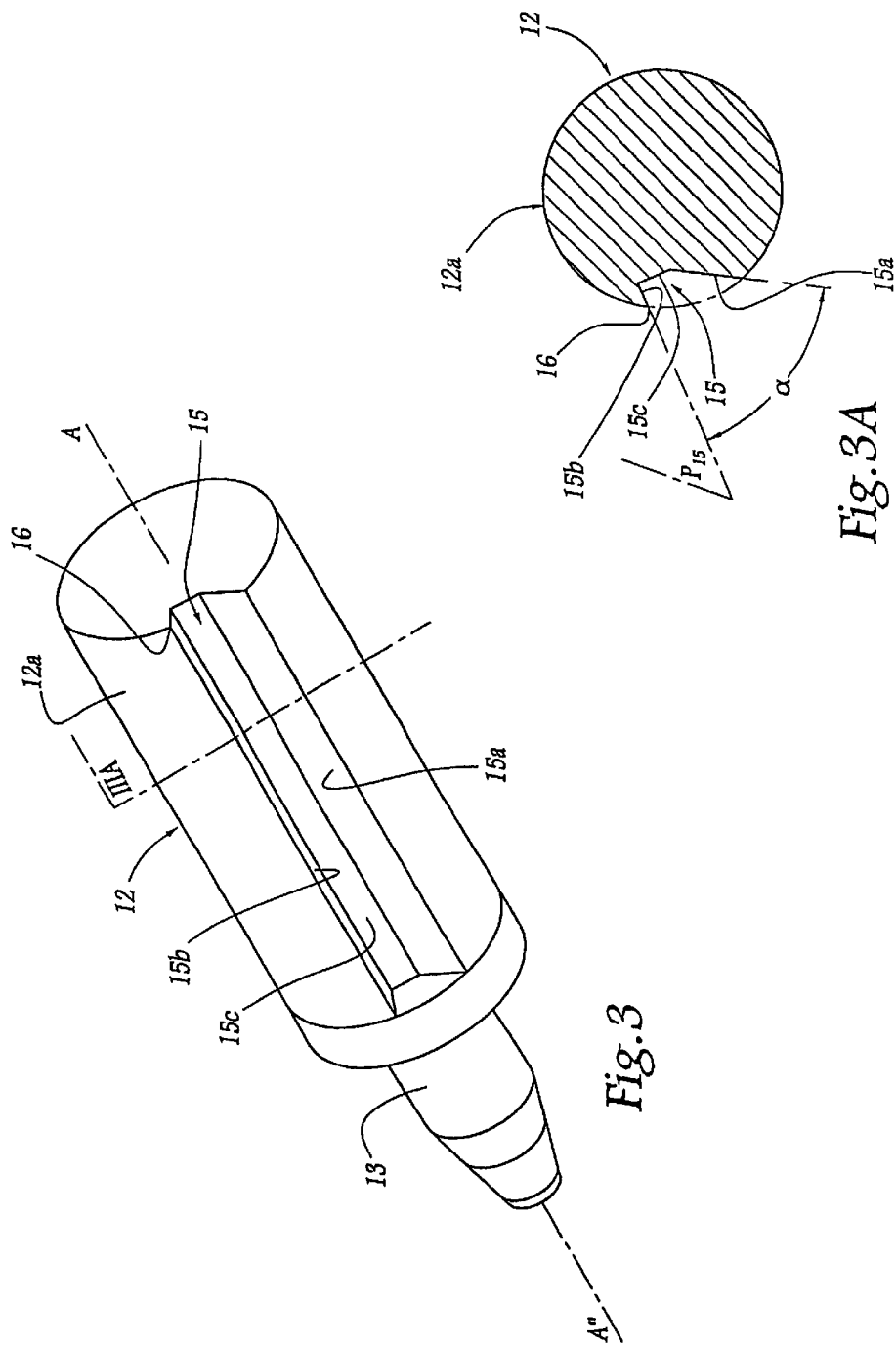
FIG. 3 is a perspective view of a portion of the layer-laying member on its own.
FIG. 3A is a section on plane III A of FIG. 3.

The device 1 shown in FIG. 1 comprises a thermally-insulated enclosure provided in its top portion with heater means (not shown). The enclosure is supported by a stationary structure and comprises a bottom 2 generally configured in the shape of a hollow rectangular parallelepiped having a cover 3 placed thereon. A window 4 e.g. made of silica, is formed in the cover 3. The window 4 serves to pass a laser beam while it is acting on a powder or powder mixture. The bottom 2 is stationary and secured to the support structure of the device 1. The cover 3 is guided horizontally in such a manner as to release full access to the inside volume of the bottom 2.

The bottom 2 presents a plane inside face 5 provided in one portion with two circular orifices 6 and 7 corresponding to the openings of two wells formed in the device 1. In each orifice, a piston 8 or 9 moves in a direction that is generally perpendicular to the plane B in which the longitudinal axis AA' of the layer-laying member is moved, each piston serving to close the corresponding orifice 6 or 7 temporarily. Thus, the face 5 forms a continuous work plane. The pistons 8 and 9 seal the wells and prevent powder or gas present in the enclosure from passing into the wells. The pistons 8 and 9 are moved between the corresponding orifices 6 or 7 and the inside of respective circular-based cylindrical wells 10 or 11 extending the orifices 6 and 7 respectively. The pistons 8 and 9 are moved independently of each other, each being actuated by a drive system, in particular by a stepper motor, by a precision screw and ball nut system, or by any other drive device. When they move, the pistons are guided by guide means such as guide elements with pre-stressed balls, for example. The guide device is not subjected to the thermal stresses encountered in the device 1. The pistons 8 and 9 are moved with precision between the bottoms of the wells 10 and 11 and the orifices 6 and 7. For each piston, the precision obtained is about plus or minus one micron on the thickness of a deposited layer of powder.

The top face of the piston 8 situated in the well 10 forms the bottom of a reserve in which a ceramic or metallic powder P or a mixture of ceramic or metallic powders is stored. These are products that are commonly available commercially.

The orifice 7 into which the piston 9 penetrates on moving inside the well 11 is situated generally vertically beneath the window 4 when the cover 3 is closed. The piston 9 carries a tray 90 which forms the deposition zone on which the powder P or powder mixture is deposited in thin layers prior to the laser acting on the material.

The tray 90 is positioned removably in the well 11, thus enabling the part to be transported, once it has been made, without it being necessary to handle the part directly. The tray 90 is positioned precisely on the piston 9 so as to ensure that the first layer of powder or powder mixture is laid accurately. This first layer serves to hold and position the part that is to be made and determines the quality of the following layers.

The stroke of the pistons 8 and 9 is adapted so that the piston 8 and the tray 90 come flush with the face 5 when the pistons are at their respective top dead-center positions.

Outside the bottom 2, a drive and guide system (not shown) serves to move in rotation and in translation a member 12 for feeding and compacting the powder P or powder mixture between the pistons 8 and 9. The guide system is adapted to guide the bottom 2 from the outside, while maintaining the enclosure thermally insulated. This guidance from the outside makes it possible to avoid the thermal and mechanical constraints that are encountered inside the enclosure.

The member 12 is a part that is preferably made of ceramic material. With such a material, and having appropriate shape and dimensions, the member 12 possesses a high degree of dimensional and geometrical stability ensuring that it is not subjected to deformation when the enclosure is heated to high temperature, e.g. to about 1200° C. Similarly, the member 12 provides a high degree of resistance to abrasion.

The member 12 is in the form of a circular cylinder provided at each of its ends in a central position with a respective stub axle 13, 14 extending along the longitudinal axis AA' of the cylinder. These stub axles 13, 14 project outside the bottom 2 by passing through its side walls, and on the outside they are associated with a motor-driven drive and guide device.

The surface state of the outside surface 12a of the cylinder is of a quality that is close to "mirror polish", or that is at least as smooth as the surface state of the deposition zone 9. Advantageously, the surface 12a presents roughness Ra that is less than or equal to 0.06 µm.

Thermal isolation between the inside of the enclosure and the outside guide and drive means is provided by a combination of flaps 20 and 21 of simple geometrical shape, in particular of triangular shape and of parallelogram shape, respectively. These flaps 20, 21 are placed in alternation on either side of the enclosure in such a manner as to constitute a baffle. The flaps are in simple mechanical contact, which means that between them they operate without friction and without wear. The flaps 20 of right-angled triangular shape are associated in such a manner as to form a rectangle, and they can be moved back and forth in a direction that is substantially parallel to the displacement of the pistons 8 and 9. The flaps 21 of parallelogram shape are movable in a direction that is generally perpendicular to the displacement of the pistons 8 and 9. In this way, the baffle constituted by the flaps 20 and 21 ensures that the enclosure remains isolated.

With such a configuration, the overall size of the device is also kept small. Thus, the cylinder 12 is put accurately into motion so as to move in the plane B over the face 5 along a stroke that is adapted to enable it to pass in succession over both of the wells 10 and 11. The parameters for servo-controlling the cylinder 12, e.g. its position and its speed of rotation, are defined as a function of the powder or powder mixture, of the thickness of the layer to be laid, and of other working parameters, such as temperature, for example.

On its cylindrical outside surface, the cylinder 12 presents a longitudinal groove 15. This groove 15 extends in a direction that is generally parallel to the longitudinal axis AA' of the cylinder 12. The groove 15 is of generally V-shaped section, having one wall 15a that slopes relative to a plane $P_{15}$ of the groove 15.

The walls 15a and 15b converge towards the bottom 15c of the groove 15. One of the walls 15b of the groove is terminated by an edge 16 where the plane $P_{15}$ intersects the outside cylindrical surface 12a of the cylinder 12. In this manner, the edge 16 forms a scraper suitable for collecting the powder P or powder mixture on the piston 8, and for directing the powder or powder mixture towards the bottom 15c of the groove 15.

The circumference of the cylinder 12 is adapted so that when it forms one complete revolution about its axis AA', it moves through a distance that is sufficient to cover the entire surface of either one of the orifices 6 or 7.

The angle of inclination of the inside wall 15b of the groove 15 is adapted so as to ensure that powder or powder mixture is taken effectively when the cylinder 12 moves over the piston 8, while subsequently ensuring that the powder P is deposited completely and quickly on the tray 90.

Figure 4A:
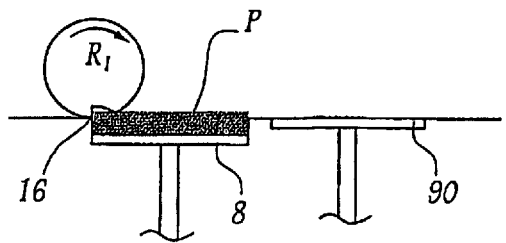
FIGS. 4A to 4G are diagrams showing various stages in taking powder from the storage means, depositing the powder, spreading the powder, and compacting it on the deposition zone.

Initially, and as shown in FIG. 4A, the cylinder 12 is in a rest position at one end of the face 5, with the groove 15 being empty. The powder P or powder mixture is stored on the piston 8, with the piston being in a position that is high enough to ensure that the powder P or powder mixture projects slightly above the face 5. The tray 90 is positioned to lie in its orifice 7 flush with the face 5.

Figure 4B:
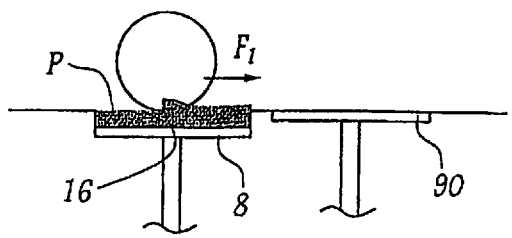

By causing the cylinder 12 to turn $R_1$ about its stub axles 13 and 14, it is moved angularly so as to bring the first edge 16 of the groove 15 into contact with the powder P in the vicinity of the periphery of the piston 8. As shown in FIG. 4B, moving the cylinder 12 in translation along arrow $F_1$ enables the powder P collected by the edge 16 and contained in the groove 15 to be taken by the cylinder 12 away from the piston 8.

Figure 4C:
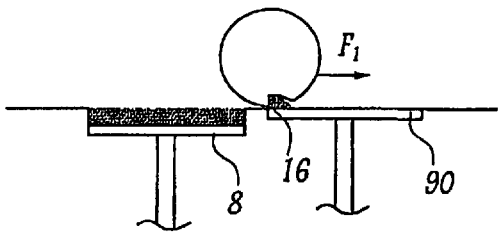

As shown in FIG. 4C, when the movement in translation $F_1$ of the cylinder 12 is continued, the groove 15 comes to the vicinity of the edge of the piston 9 where the powder P is deposited on the tray 90 by gravity in the vicinity of the periphery thereof.

Figure 4D:
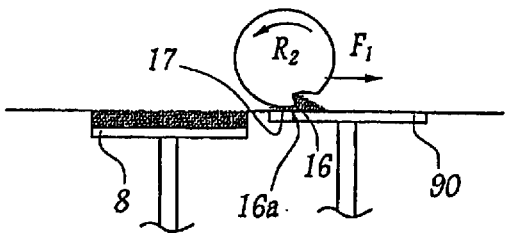

Thereafter, as shown in FIG. 4D, the cylinder 12 is caused to turn $R_2$ so as to position a generator line 17 of its cylindrical surface 12a above the tray 90. The powder P can be distributed uniformly and easily on the tray 90, e.g. by moving the cylinder in translation $F_1$ with the generator line 17 acting like a scraper to spread the powder on the tray 90. A portion 16a of the cylindrical surface 12a of the cylinder, generally situated between the generator line 17 and the edge 16 also contributes to spreading the powder.

Simultaneously with depositing the powder, the piston 9 is moved towards the orifice 7 so that the gap between the tray 90 or the previously-deposited layer and the cylinder 12 is generally equal to the thickness of the spread layer of powder prior to being compacted. Where necessary, it is possible to perform a plurality of operations of collecting and spreading the powder or the powder mixture. To do this, intermediate thickness are set for the layers. Depending on the nature of the powder or the powder mixture, the increase in the thickness of the deposited layer is determined by the settings. By way of example, this increase can be non-linear and decreasing, of the type:

$$y=(ax+b)/(cx+d)$$

Figure 4E:
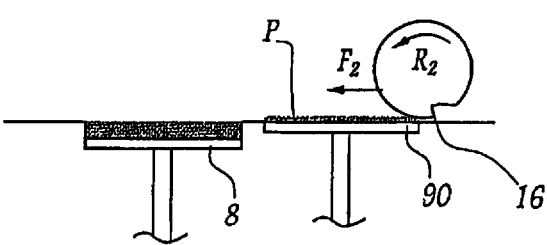
Figure 4F:
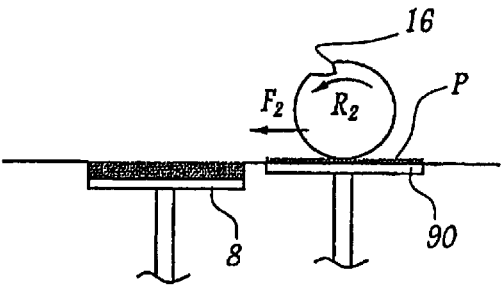

At the end of this displacement, as shown in FIG. 4E, once the cylinder 12 has its groove 15 empty and the powder P has been distributed over the tray 90, as shown in FIG. 4E, the cylinder 12 is turned in the direction $R_2$.

Figure 4G:
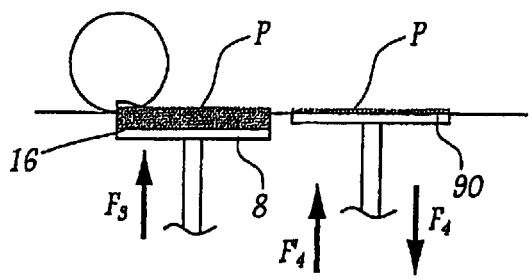

This direction of rotation $R_2$ is opposite to the direction of rotation $R_1$ and serves to return the cylinder 12 along arrow $F_2$ towards its initial position, as shown in FIG. 4G. During this compacting stage, the piston 8 and the tray 90 move so as to define a gap relative to the cylinder 12 that corresponds to the final thickness of the layer. During this rotation $R_2$, the cylinder 12 passes over the tray 90 in the opposite direction, thereby smoothing and compacting the powder P by means of the outside surface 12a of the cylinder 12. During this pass, the fact that the surface state of the surface 12a is close to a mirror polish, means that it is possible to deposit and then compact a powder P regardless of the nature and/or the grain size of the powder. The surface 16a also contributes to smoothing. When developed, the circumference of the cylinder 12 is greater than the diameter of the tray 90. If necessary, the compacting operation can be repeated until a desired thickness has been obtained.

During compacting and if necessary, the piston 9 and the tray 90 are moved in direction $F_4$ or $F'_4$, while the cylinder 12 is performing the movement $R_2$, $F_2$.

Moving the piston 8 towards the orifice 6 in direction $F_3$ enables the powder P to be put back into a position where it can be taken by the groove 15.

Moving the piston 9 in the direction $F_4$ enables the top surface of the previously-deposited layer to be made generally coplanar with the face 5.

The layer of powder or powder mixture as spread in this way can then be subjected to the action of a laser beam, e.g. in a sintering or fusing process, with all of the operations taking place in the enclosure which is maintained at high temperature and kept gastight.

In a variant, the powder or powder mixture is laid in layers at ambient temperature, e.g. while the enclosure is open.

It then suffices to repeat the preceding steps in order to spread and then compact a plurality of layers of powder or powder mixture in succession.

Figure 5:
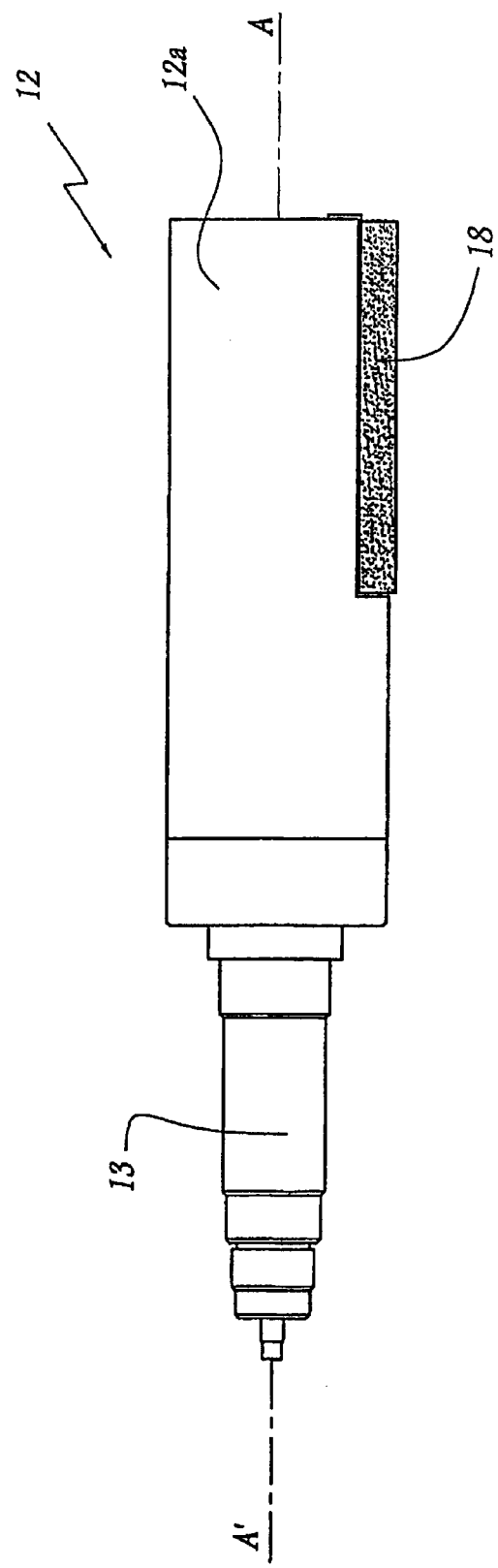
FIG. 5 is a fragmentary diagrammatic view of a layer-laying member in another embodiment.
Figure 6:
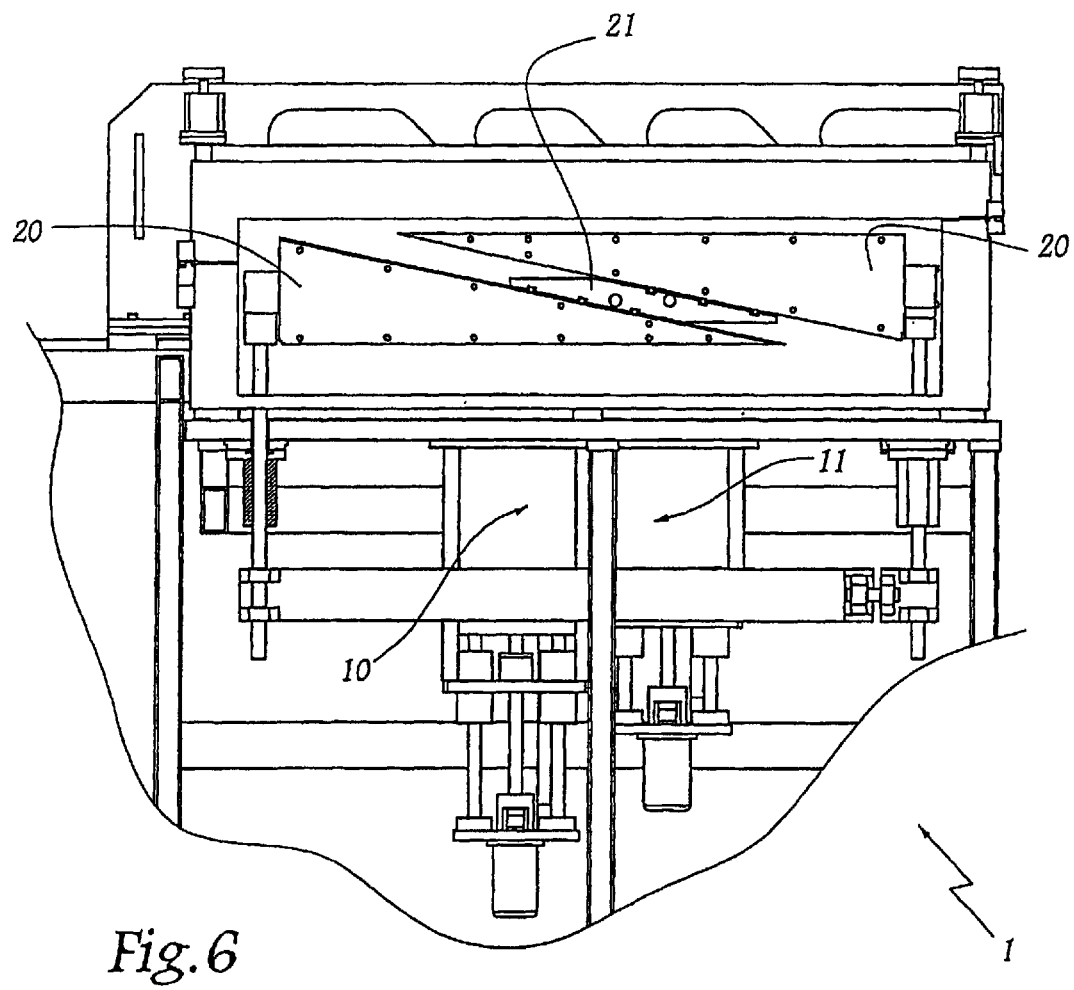
FIG. 6 is a section on line VI-VI of FIG. 2, in which the layer-laying member and the guide and drive elements are not shown.

Using such a spreader and compactor member, uniform layers are laid on the tray 90 of thickness that may be as little as 5 µm, depending on the grain size of the powder P used, ready for action by a laser on the powder. As shown in FIG. 5, it is possible to have a cylinder 12 with a scraper that is not formed by an edge 16 of the groove 15, but by a fitting 18 fitted to an edge of the groove 15. This fitting 18 is secured in definitive manner, e.g. by welding or by screw-fastening.

Such a device for laying thin layers can thus be used in a confined atmosphere, i.e. while the cover 3 is closed, optionally at high temperatures or very high temperatures, or in ambient air, particularly if that is possible given the grain size and the nature of the powder. When operating in ambient air the cover 3 remains open. The guide means, both for the cylinder 12 and for the pistons 8 and 9, are located outside the working enclosure and the sealing and thermal isolation means protect them from the powder and the high temperature, if any.

In another configuration, and as a function of the diameter of the orifices 6 and 7 and/or of the spacing between them, it is possible to use a cylinder 12 provided with a plurality of grooves 15 that are optionally identical.

Similarly, the shape of the groove 15 may be different from that shown.

In a variant, a groove 15 could be formed over a fraction only of the length of the cylinder 12.

The invention claimed is:

1. A device for laying at least one thin layer of a powder (P) or powder mixture, the device being used to enable a laser to act on the material contained in a thermal enclosure, the device comprising storage means (8), powder or powder mixture feeder means (12), a deposition zone (9) for depositing said powder or powder mixture taken from said storage means, and means for compacting the powder or powder mixture deposited in said deposition zone, the device being characterized in that it comprises a circular cylinder (12) provided firstly with at least one groove (15) formed in an outside surface of said cylinder (12) and adapted to take powder or powder mixture from a storage means (8) and feed it to a deposition zone (9), and secondly with a surface (12a, 16a) adapted to compact the powder (P) or powder mixture previously deposited on said deposition zone (9), said cylinder (12), said storage means (8), said deposition zone (9), and the powder (P) or powder mixture being situated inside said enclosure that is suitable for being maintained at high temperature while enabling the cylinder (12) to be guided and driven from outside said enclosure.

2. A device according to claim 1, characterized in that said surface (12a, 16a) adapted for compacting comprises at least a fraction (12a, 16a) of an outside surface of said cylinder (12) in which at least one groove (15) is formed.

3. A device according to claim 1, characterized in that said groove (15) extends between the two ends of the cylinder (12), in a direction that is generally parallel to the longitudinal axis (AA') of said cylinder.

4. A device according to claim 1, characterized in that said groove (15) presents a cross-section that is generally in the configuration of a flat-bottomed V-shape.

5. A device according to claim 1, characterized in that the circumference of the cylinder (12) is perceptibly greater than the diameter of the deposition zone (9).

6. A device according to claim 1, characterized in that the roughness of the outside surface (12a) of said cylinder (12) is smaller than the roughness of the surface of said deposition zone (9), said roughness of the outside surface (12a) being adapted to the minimum grain size of the powder (P) used.

7. A device according to claim 1, characterized in that the enclosure and the elements (8, 9, 12, P) situated therein are maintained at a temperature that lies between ambient temperature and about 1200° C.

8. A device according to claim 1, characterized in that the positioning, guidance, and drive of the cylinder (12) are performed by positioning and guide means, and by an actuator situated outside the enclosure of the device.

9. A device according to claim 1, characterized in that flaps (20, 21) disposed in the flanks of the enclosure are movable in different directions relative to a plane (B) in which the longitudinal axis (AA') of the cylinder (12) moves when the cylinder is moved.

10. A device according to claim 9, characterized in that the flaps (20, 21) are of triangle shape (20) and of parallelogram shape (21), being disposed in a baffle configuration and in mutual contact so as to provide thermal isolation for the enclosure while allowing said cylinder to be connected to the positioning, guide, and drive members for said cylinder (12).

* * * * *